United States Patent
Chen et al.

(10) Patent No.: US 12,034,266 B2
(45) Date of Patent: Jul. 9, 2024

(54) OPTICAL ISOLATOR CORE

(71) Applicant: Lumentum Operations LLC, San Jose, CA (US)

(72) Inventors: Jian Chen, San Juan, CA (US); Chang Xiao, Shenzhen (CN); Xia Hong, Fremont, CA (US); Fangdong Zhao, Shenzhen (CN)

(73) Assignee: Lumentum Operations LLC, San Jose, CA (US)

( * ) Notice: Subject to any disclaimer, the term of this patent is extended or adjusted under 35 U.S.C. 154(b) by 606 days.

(21) Appl. No.: 17/164,191

(22) Filed: Feb. 1, 2021

(65) Prior Publication Data

US 2021/0351555 A1   Nov. 11, 2021

(30) Foreign Application Priority Data

May 7, 2020   (WO) ................ PCT/CN2020/088952
Sep. 30, 2020   (WO) ................ PCT/CN2020/119360

(51) Int. Cl.
*G02B 6/27* (2006.01)
*G02B 6/12* (2006.01)
(Continued)

(52) U.S. Cl.
CPC .......... *H01S 3/063* (2013.01); *G02B 6/12019* (2013.01); *G02B 6/4204* (2013.01); *H01S 3/1022* (2013.01)

(58) Field of Classification Search
CPC .. H01S 3/063; H01S 3/1022; H01S 3/094003; G02B 6/12019; G02B 6/4204; G02B 6/2746; G02B 6/4208
See application file for complete search history.

(56) References Cited

U.S. PATENT DOCUMENTS 5,493,440 A * 2/1996 Souda ................ H01S 3/06754
                                                       359/341.1
5,835,270 A * 11/1998 Urino ..................... G02F 1/093
                                                       359/484.04
(Continued)

FOREIGN PATENT DOCUMENTS

CN      1317897 A    10/2001
CN      2499864 Y    7/2002
(Continued)

OTHER PUBLICATIONS

International Search Report and Written Opinion for Application No. PCT/CN2020/088952, mailed on Jan. 27, 2021, 9 pages.
(Continued)

*Primary Examiner* — Xinning(Tom) Niu
(74) *Attorney, Agent, or Firm* — Harrity & Harrity, LLP

(57) ABSTRACT

In some implementations, an optical isolator core includes a Faraday rotator and a plurality of birefringent crystal plates. The plurality of birefringent crystal plates may include a first birefringent crystal plate to separate input light into light having a first polarization and light having a second polarization, and a second birefringent crystal plate to combine the light having the first polarization and the light having the second polarization in output light that is laterally displaced by the single stage optical isolator. The Faraday rotator may be provided between the first birefringent crystal plate and the second birefringent crystal plate. In some implementations, the plurality of birefringent crystal plates further include a third birefringent crystal plate provided between the Faraday rotator and the second birefringent crystal plate. Additionally, or alternatively, the optical isolator core may further include a half-wave plate arranged between the Faraday rotator and the first birefringent crystal plate.

20 Claims, 11 Drawing Sheets

(51) Int. Cl.
*G02B 6/42* (2006.01)
*H01S 3/063* (2006.01)
*H01S 3/102* (2006.01)

(56) References Cited

U.S. PATENT DOCUMENTS

| | | | | |
|---|---|---|---|---|
| 6,088,153 | A * | 7/2000 | Anthon | G02B 6/2746 359/341.32 |
| 6,430,323 | B1 * | 8/2002 | Kokkelink | G02F 1/093 385/11 |
| 2001/0053022 | A1 * | 12/2001 | Tai | H01S 3/06754 359/484.03 |
| 2002/0089745 | A1 * | 7/2002 | Huang | G02F 1/093 359/484.03 |
| 2005/0280888 | A1 * | 12/2005 | Pan | G02B 6/4209 359/337 |

FOREIGN PATENT DOCUMENTS

| | | |
|---|---|---|
| CN | 1365011 A | 8/2002 |
| CN | 201072472 Y | 6/2008 |
| CN | 202794598 U | 3/2013 |
| CN | 103576346 A | 2/2014 |
| CN | 108020924 A | 5/2018 |
| CN | 108700791 A | 10/2018 |
| CN | 210109495 U | 2/2020 |
| EP | 0939465 A2 | 9/1999 |

OTHER PUBLICATIONS

International Search Report and Written Opinion for Application No. PCT/CN2020/119360, mailed on Jan. 28, 2021, 10 pages.

\* cited by examiner

OPTICAL ISOLATOR CORE

CROSS-REFERENCE TO RELATED APPLICATIONS

This application claims priority to Patent Cooperation Treaty (PCT) Application No. PCT/CN2020/088952, entitled "OPTICAL ISOLATOR CORE IN BETWEEN FIBER AND COLLIMATOR LENS," filed on May 7, 2020, and PCT Application No. PCT/CN2020/119360, entitled "OPTICAL ISOLATOR CORE," filed on Sep. 30, 2020, the contents of which are incorporated by reference herein in their entirety.

TECHNICAL FIELD

The present disclosure relates generally to optical systems and to optical isolator core designs to provide a lateral displacement walk-off for light received at the optical isolator core.

BACKGROUND

An optical isolator (sometimes referred to as an optical diode or a Faraday isolator, among other examples) is an optical device that transmits light in a certain direction while blocking light in an opposite direction. Optical isolators are typically used to prevent unwanted feedback from outside of an optical oscillator, such as a laser cavity. For example, in some cases (e.g., at high powers), optical feedback can damage or disrupt the operation of a laser system. To reduce the optical feedback, an optical isolator can be inserted into the laser system. The optical isolator may be a passive unidirectional, nonreciprocal device that utilizes the phenomenon of magneto-optic rotation to isolate a source and protect a laser oscillator from reflections.

SUMMARY

In some implementations, an optical assembly includes a first optical fiber and a second optical fiber; a pump laser to provide pump light having a first wavelength, the pump light coupling into the first optical fiber through a first collimator lens, a wavelength-division multiplexing filter, a second collimator lens, and a compensator arranged between the first optical fiber and the second collimator lens; and an isolator arranged between the second optical fiber and the second collimator lens to transmit signal light having a second wavelength, wherein the isolator includes a Faraday rotator and a plurality of birefringent crystal plates to laterally displace the signal light.

In some implementations, a single stage optical isolator includes a Faraday rotator; and a plurality of birefringent crystal plates, wherein the plurality of birefringent crystal plates include a first birefringent crystal plate to separate input light into light having a first polarization and light having a second polarization, and a second birefringent crystal plate to combine the light having the first polarization and the light having the second polarization in output light that is laterally displaced by the single stage optical isolator, wherein the Faraday rotator is provided between the first birefringent crystal plate and the second birefringent crystal plate.

In some implementations, a dual stage optical isolator includes a first isolator core comprising a first set of layers including a first half-wave plate and a first Faraday rotator arranged between a first pair of birefringent crystal plates; and a second isolator core comprising a second set of layers including a second half-wave plate and a second Faraday rotator arranged between a second pair of birefringent crystal plates, wherein the first set of layers and the second set of layers have identical thicknesses and respective magnetic orientations to cancel a material tolerance and an assembly tolerance with respect to one another.

DETAILED DESCRIPTION

Figure 1A:
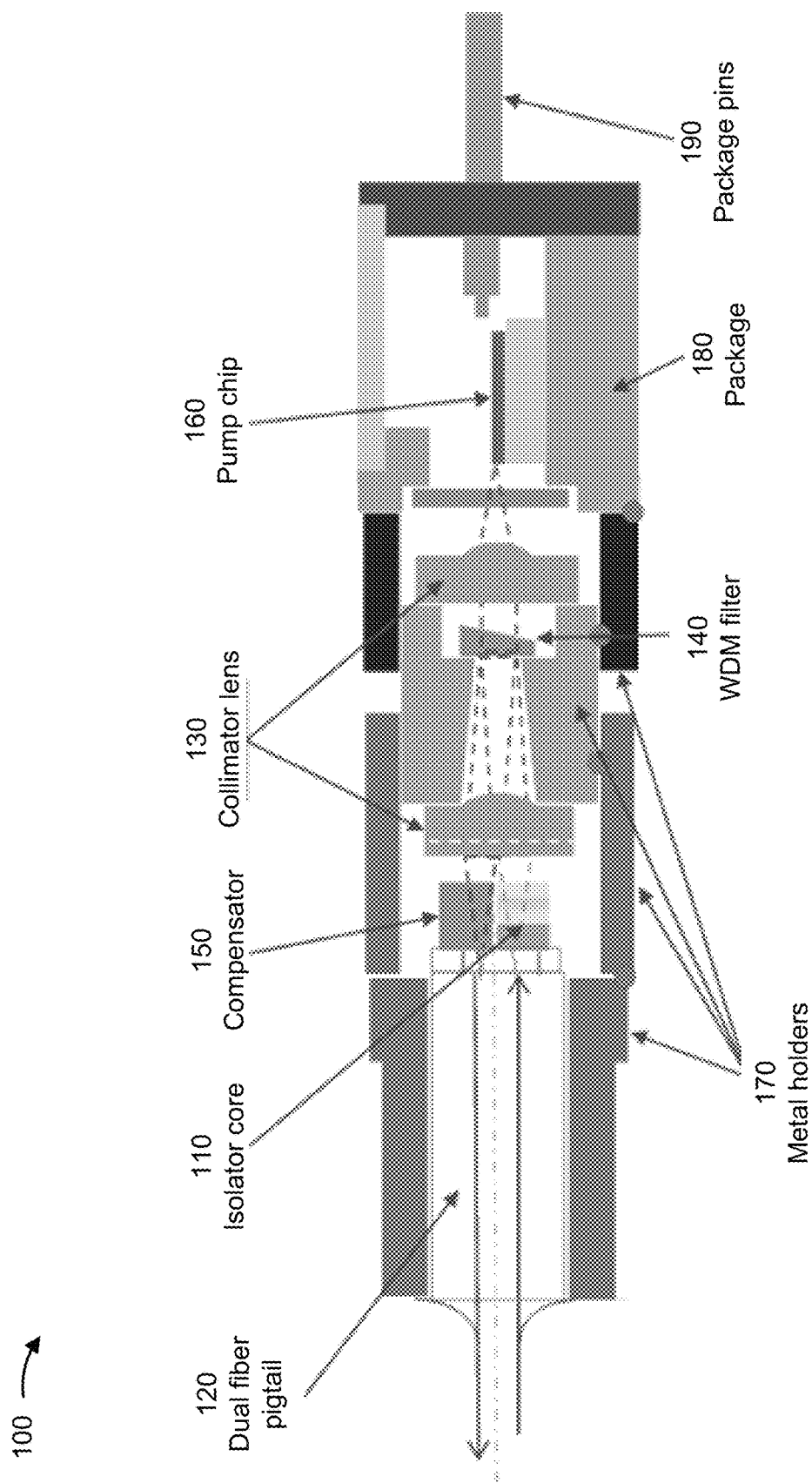
FIGS. 1A-1E illustrate one or more example implementations of a single stage isolator.

The following detailed description of example implementations refers to the accompanying drawings. The same reference numbers in different drawings may identify the same or similar elements.

An optical isolator is a device that is generally designed to allow light to travel in a forward direction while blocking reflections that would travel in a backward direction. Optical isolators are important in many optical systems and applications. For example, a single-frequency semiconductor laser is very susceptive to external optical feedback. Even a very low level of optical reflection from an external optical circuit (e.g., on the order of −50 dB) is sufficient to cause a significant increase in laser phase noise, intensity noise, and/or wavelength instability, among other examples. Accordingly, an optical isolator is often provided at the output of each laser diode in applications that require low optical noise and stable single optical frequency. Another example is in an optical amplifier where unidirectional optical amplification is desired. In this case, the bidirectional nature of optical amplification of the optical gain medium would cause self-oscillation if the external optical reflection from, for example, connectors and other optical components is strong enough.

A traditional optical isolator is based on a Faraday rotator provided between two polarizers (e.g., an input polarizer and an output polarizer). In this configuration, input light received at the optical isolator passes through the input polarizer, which has an optical axis that matches a polarization orientation of the input light. The Faraday rotator then rotates the polarization of the input light signal by 45 degrees in a clockwise direction. The optical axis of the output polarizer is oriented 45 degrees with respect to the input polarizer, which allows the optical signal to pass through with little attenuation. If there is a reflection from one or more components downstream from the output polarizer, the reflected light has to pass through the output polarizer and the Faraday rotator. Because the Faraday rotator is a nonreciprocal device, the polarization state of the reflected light will rotate an additional 45 degrees in the same direction as the input light, thus becoming orthogonal to the optical axis of the input polarizer. The input polarizer therefore effectively blocks the reflected light and ensures unidirectional light transmission through the optical isolator.

Accordingly, in a traditional optical isolator design, an optical core deflects a collimated light beam with a small angle, which may be used in a collimated light beam application. For example, one collimated light beam application may involve integrating an isolator core with a wavelength division multiplexer (WDM) filter and pump chip in an optical assembly that combines light beams having different wavelengths (e.g., a pump combiner). For example, the optical assembly may include an input leg that receives an input signal at a first wavelength (e.g., 1550 nanometers (nm)) and an output leg in which the input signal at the first wavelength is combined with pump light having a second wavelength (e.g., 980 nm). The typical approach in such collimated light beam applications is to place the optical isolator in an area between the WDM filter and a collimator lens, which has the most physical space to integrate the optical isolator within the device. However, if the optical isolator is placed in the area between the WDM filter and the collimator lens, the optical isolator may block the pump light that is traveling in a reverse direction relative to the input light (e.g., because optical isolators typically include material, such as garnet, that has a high absorption for 980 nm pump light).

Some implementations described herein provide an isolator core and/or an optical system (e.g., an optical assembly and/or an optical device) that includes an isolator core designed to provide a lateral displacement walk-off. For example, rather than deflecting light in an input beam received at the isolator core, the isolator core may include a Faraday rotator, a plurality of birefringent crystal plates, and/or a half-wave plate (HWP) arranged to spatially separate and/or combine orthogonal polarization components of the input beam with low polarization mode dispersion (PMD), polarization dependent loss (PDL), and/or insertion loss (IL). Furthermore, the isolator core may have a design that prevents backward travelling light entering an output side of the optical isolator from coupling into an input side of the optical isolator, which may achieve optical isolation. In some implementations, the isolator core may be positioned in an optical assembly between an optical fiber and a collimator lens to enable a same side input/output fiber (i.e., same side of an assembly), an integrated 980 nm/1550 nm WDM function, self-compensated PMD, and/or self-compensated PDL. In some implementations, the isolator core may have a design that conserves space by utilizing space between the optical fiber and the collimator lens. Furthermore, the isolator core design may provide flexibility to place the isolator core in an input leg of an optical assembly, an output leg of an optical assembly, or both the input and output legs of an optical assembly. For example, in a forward pump erbium doped fiber amplifier (EDFA) where 980 nm pump light is coupling through a WDM filter into the output leg, the isolator core may be arranged in the input leg (e.g., because the isolator core may otherwise block the 980 nm pump light). In another example, in a reverse pump EDFA where 980 nm pump light couples through a WDM filter into the input leg, the isolator core may be provided in the output leg. In some implementations, the optical isolator design may enable an input fiber and an output fiber to be on the same side of an assembly, which may enable integration with a 980 nm pump laser chip and/or a monitor photodiode.

Figure 1B:
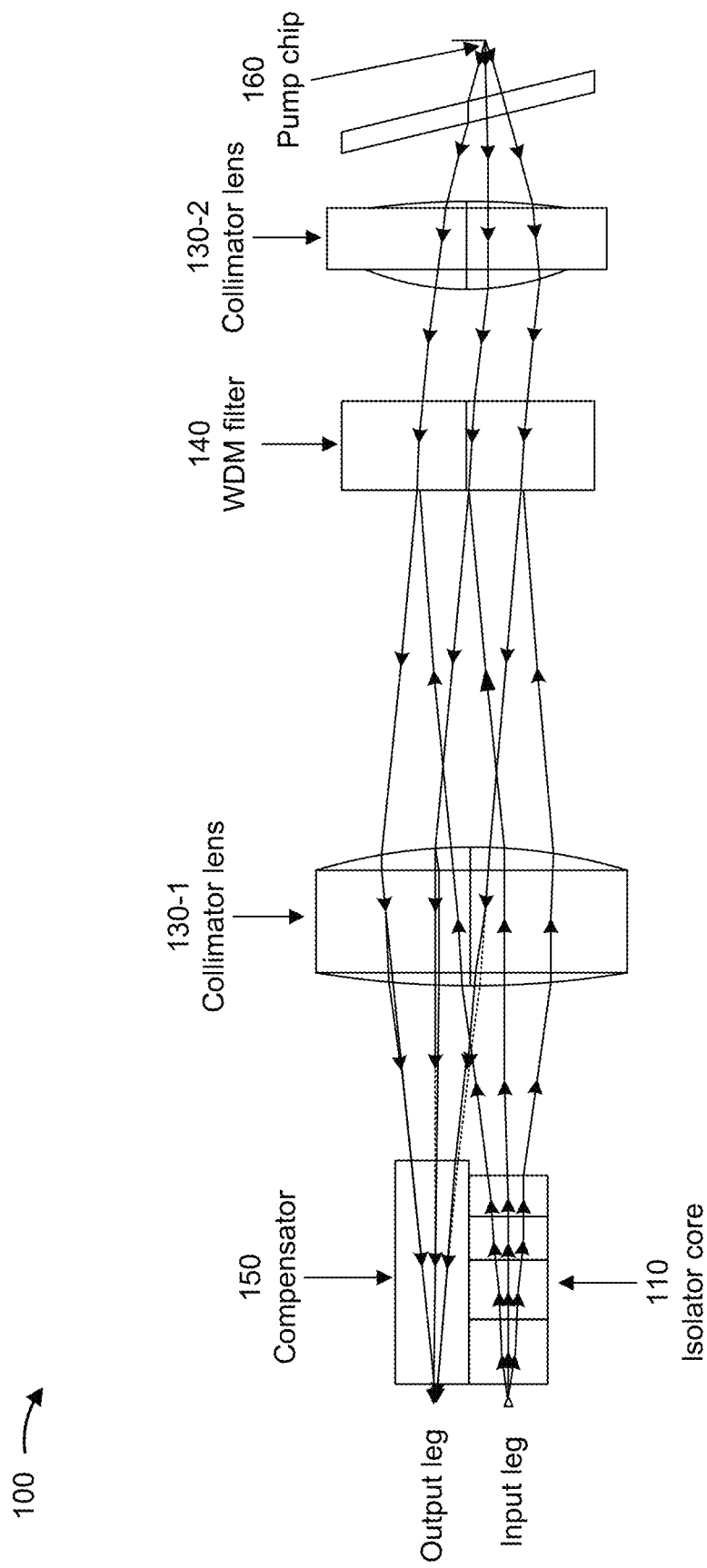
Figure 1C:
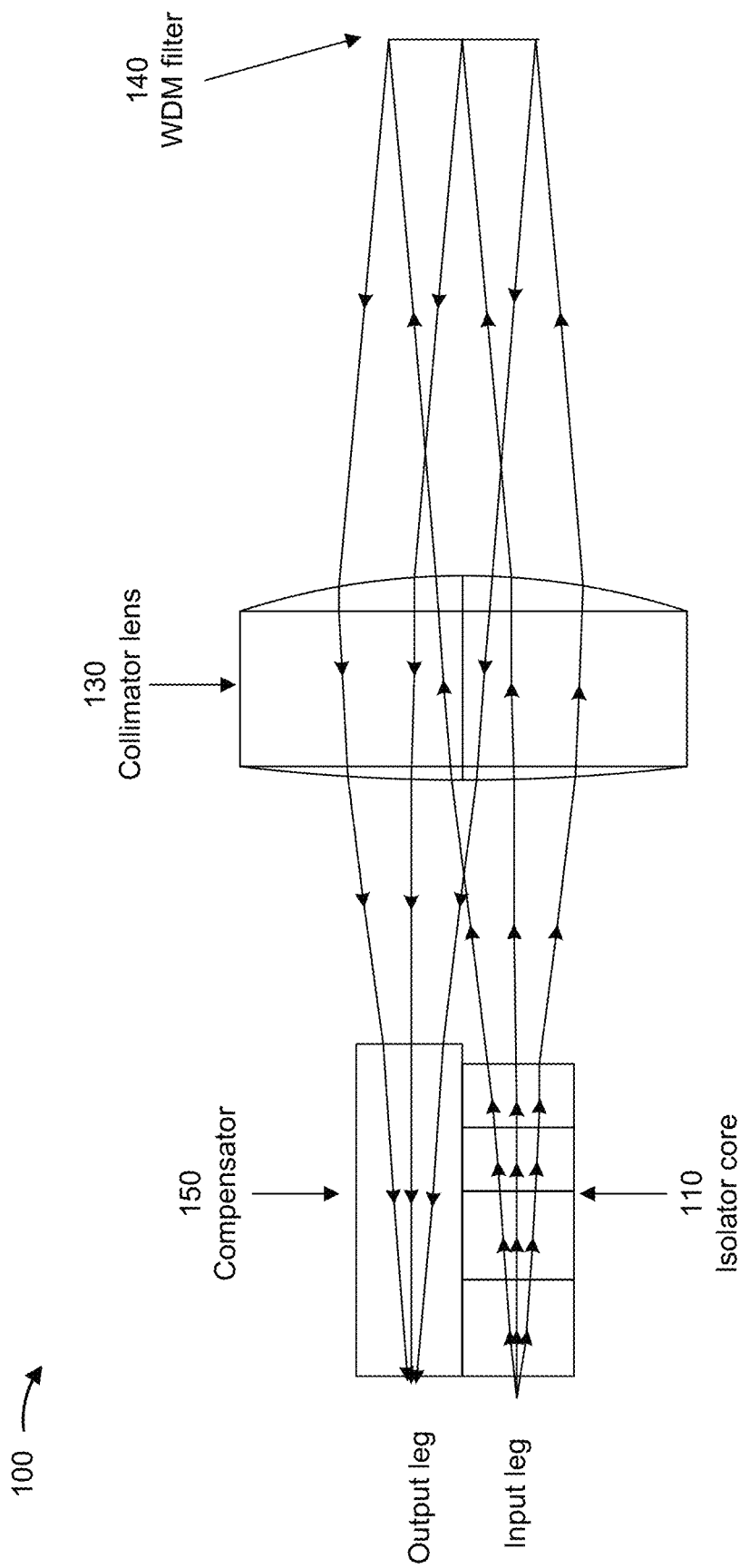

FIGS. 1A-1E illustrate one or more example implementations 100 of a single stage isolator 110. As shown in FIGS. 1A-1C, for a forward pumped EDFA, the single stage isolator 110, which may be referred to herein as isolator core 110, may be arranged in an optical assembly to laterally displace an input light beam received at the isolator core 110. For example, as shown, the isolator 110 may be used in an optical assembly, such as a pump combiner, that includes or interfaces with a dual fiber pigtail 120 that includes an input optical fiber in an input leg of the optical assembly and an output optical fiber in an output leg of the optical assembly. As shown in FIGS. 1A-1C, the single stage isolator core 110 may be positioned between the dual fiber pigtail 120 and a first collimator lens 130-1 (e.g., a first aspheric lens (A-lens)). The optical assembly may further include a pump chip (or pump laser) 160 to provide pump light that has a first wavelength (e.g., 980 nm), which may couple into the output leg through a second collimator lens 130-2 (e.g., a second A-lens), a WDM filter 140, the first collimator lens 130-1, and a compensator 150 arranged between the dual fiber pigtail 120 and the first collimator lens 130-1.

As shown in FIGS. 1A-1C, the optical assembly may be a pump combiner, a forward pump EDFA, or another suitable device in which the single stage isolator core 110 is provided in the input leg to receive signal light having a second wavelength (e.g., 1550 nm), which is combined in the output leg with the pump light from the pump chip 160. In this case, the pump light may couple into the output leg through the second collimator lens 130-2, the WDM filter 140 (which is transmissive at the wavelength of the pump light), the first collimator lens 130-1, and the compensator 150. Alternatively, in a reverse pump EDFA (not shown) or another suitable device in which the pump light is to be coupled into the input leg, the single stage isolator core 110 may be provided in the output leg, and the pump light may be coupled into the input leg through the second collimator lens 130-2, the WDM filter 140, the first collimator lens 130-1, and the compensator 150. Accordingly, the isolator core 110 and the compensator 150 may be arranged adjacent to one another in the input leg and the output leg (or vice versa), between the dual fiber pigtail 120 and the first collimator lens 130-1.

In some implementations, the optical assembly may be provided in an integrated module having a highly-integrated pump platform (HIPP) design. For example, as shown in FIG. 1A, the integrated module may include various mechanical components, such as metal holders 170 to fix or otherwise support optical components such as the dual fiber pigtail 120, the isolator core, the compensator 150, the collimator lenses 130, and the WDM filter 140. Additionally, in cases where the isolator core 110 is integrated with the pump chip 160, the integrated module may include a package 180 to mount the pump chip 160 and package pins 190 to interface with one or more external components. In another example, the isolator core 110 may be used in the input leg and/or the output leg of a free space optics configuration or another suitable configuration that may be part of a larger assembly without having optical fibers that directly couple into and/or out of the isolator core 110 and the compensator 150. Accordingly, it will be appreciated that the assemblies described herein are exemplary only, and that the isolator core 110 and/or variants thereof may be used in any suitable optical device or application.

In some implementations, by positioning the isolator core 110 and the compensator 150 between the dual fiber pigtail 120 and the first collimator lens 130-1, an optical isolation of more than 18 decibels (dB) may be achieved between the input leg and the output leg. In some implementations, the compensator 150 may compensate an optical path between the input leg and the output leg. In some implementations, in the optical assembly shown in FIG. 1A, a fiber core of the input leg and a fiber core of the output leg may have a fiber-core-to-fiber-core distance of 460 microns (μm), the collimator lenses 130 may have a 2.7 millimeter (mm) focal length, and the WDM filter 140 may be a 980 nm (transmissive)/1550 nm (reflective) filter. The input leg and the output leg may be a thermal expanded core (TEC) fiber that expands a fiber mode diameter from 6 μm to 9 μm. In this way, an optical device including the isolator core 110 may have a diameter of 3.0 mm or less.

In some implementations, as described herein, the isolator core 110 may be configured to receive and provide a lateral displacement walk-off to transmit the signal light towards the first collimator lens 130-1, which produces a collimated light beam that is reflected by the WDM filter 140 (e.g., the WDM filter 140 is transmissive at the wavelength associated with the pump light and reflective at the wavelength associated with the signal light). In this way, the pump light and the signal light are combined and couple into the compensator 150 through the first collimator lens 130-1. Furthermore, by positioning the isolator core 110 between the dual fiber pigtail 120 and the first collimator lens 130-1 (rather than between the first collimator lens 130-1 and the WDM filter 140), the isolator core 110 does not block the pump light traveling in the reverse direction relative to the (input) signal light. In some implementations, to laterally displace the signal light, the isolator core 110 may include a set of layers or components that are designed to spatially separate and combine orthogonal polarization components of the signal light with a low PMD, a low PDL, and/or a low IL. As described herein, the isolator core 110 may include a Faraday rotator, an input polarizer (e.g., a first birefringent crystal plate), an output polarizer (e.g., a second birefringent crystal plate), and an additional component (e.g., a third birefringent crystal plate or a half-wave plate) that are bonded together (e.g., by an adhesive material, such as epoxy and/or the like). Furthermore, as described herein, a thickness and an angle of the various layers or components of the isolator core 110 may be controlled to create the lateral displacement walk-off.

Figure 1D:
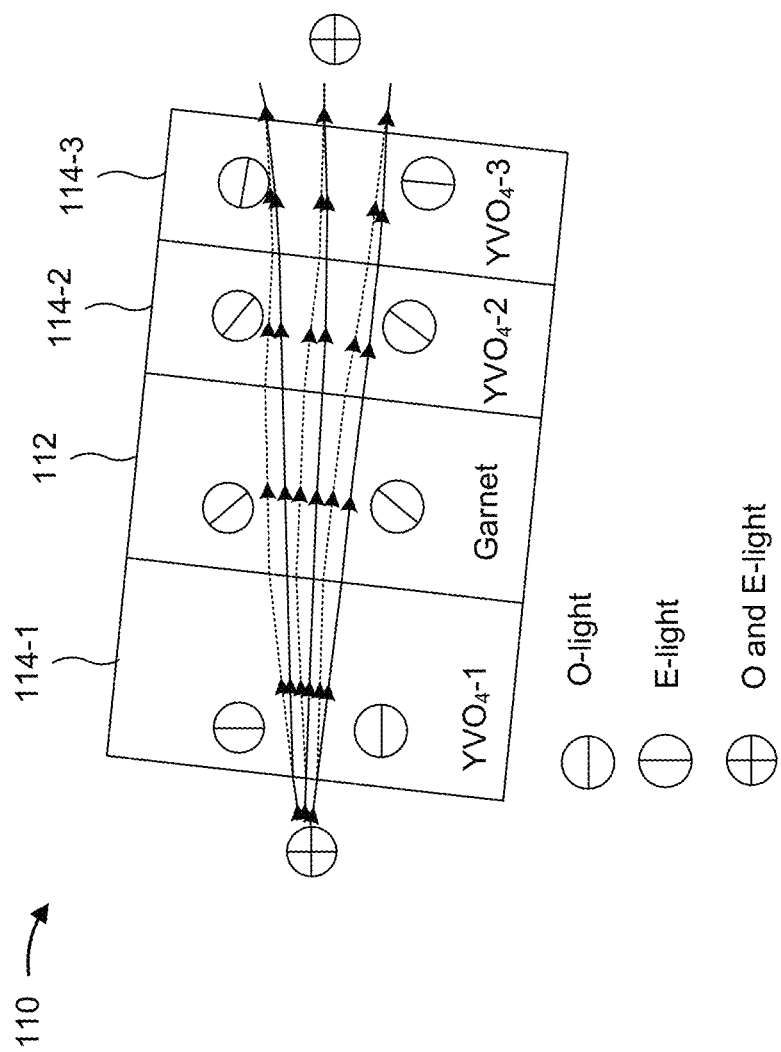

For example, as shown in FIG. 1D, the isolator core 110 may include a Faraday rotator 112 made from garnet, and a first birefringent crystal plate 114-1 to receive input light that includes orthogonal polarization components (e.g., O-light and E-light, which may respectively refer to light having a horizontal polarization and light having a vertical polarization). In some implementations, the input light may be spatially separated into the orthogonal polarization components by the first birefringent crystal plate 114-1. For example, the first birefringent crystal plate 114-1 may include a birefringent material, such as Yttrium orthovanadate ($YVO_4$), or another suitable material that has a refractive index that depends on the polarization and propagation direction of light. Accordingly, because the orthogonal polarization components have different polarizations, the first birefringent crystal plate 114-1 has a different refractive index with respect to the O-light and the E-light, which causes the O-light and the E-light to be spatially separated. However, at the output of the isolator core 110, the O-light and the E-light has to combine together exactly to avoid polarization-dependent loss or other performance issues. Accordingly, after the O-light and the E-light passes through the first birefringent crystal plate 114-1, the O-light and the E-light are rotated by the Faraday rotator 112, and another pair of birefringent crystal plates 114-2, 114-3 are provided to combine the O-light and the E-light.

In general, controlling the thickness and angle of the Faraday rotator 112 and the three birefringent crystal plates 114 may be challenging during an assembly process, as the Faraday rotator 112 and the three birefringent crystal plates 114 may have different material tolerances (e.g., plus or minus ten microns relative to a desired thickness) and different assembly tolerances (e.g., plus or minus a number of degrees relative to a desired angle). Accordingly, in some implementations, the Faraday rotator 112 may have a fixed orientation with respect to one of the adjacent birefringent crystal plates 114 (e.g., birefringent crystal plate 114-1 or birefringent crystal plate 114-2), and the other two birefringent crystal plates 114 may be rotated with two degrees of freedom to tune the necessary angles to ensure that the O-light and the E-light combines precisely at the output from the third birefringent plate 114-3. For example, in some implementations, the Faraday rotator 112 and the first birefringent crystal plate 114-1 may be fixed, and the other birefringent crystal plates 114-2, 114-3 may be rotated to compensate for the different material and/or assembly tolerances. Alternatively, the Faraday rotator 112 and the second birefringent crystal plate 114-2 may be fixed, and the other birefringent crystal plates 114-1, 114-3 may be rotated to compensate for the material and/or assembly tolerances. In this way, as shown in FIG. 1D, the O-light and the E-light may be combined in the light that is output from or otherwise transmitted by the isolator core 110. In one example, Table 1 below shows design characteristics of the isolator core 110 that may achieve a lateral displacement walk-off, where α, β, and γ are azimuth angles of the optical axes of each birefringent crystal plate 114, one of which is fixed with respect to the Faraday rotator 112 and two of which are rotatable.

TABLE 1

|  | Thickness (mm) | cos(α) | cos(β) | cos(γ) |
|---|---|---|---|---|
| $YVO_4$-1 | 0.450 | 0.688 | 0.000 | 0.726 |
| Garnet | 0.42 |  | −45° rotation |  |
| $YVO_4$-2 | 0.300 | −0.465 | 0.507 | 0.726 |
| $YVO_4$-3 | 0.300 | 0.507 | 0.465 | 0.726 |

Figure 1E:
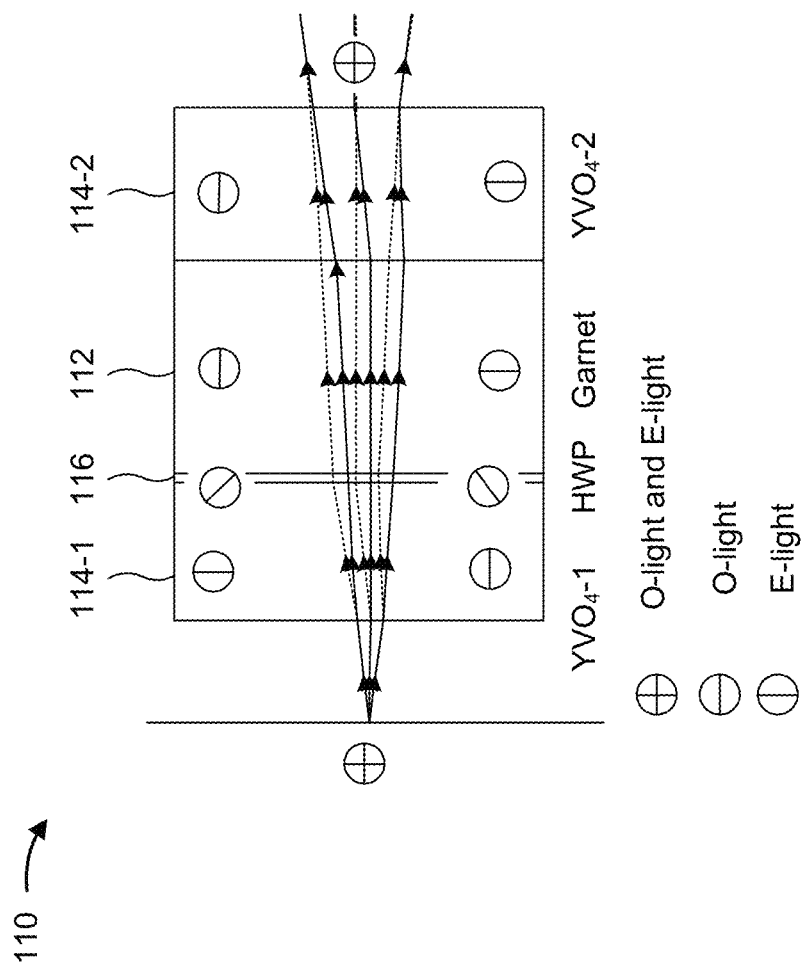

Alternatively, in some implementations, the single stage isolator core 110 may have a design as shown in FIG. 1E, where the isolator includes a first birefringent crystal plate 114-1, a half-wave plate (HWP), a Faraday rotator 112, and a second birefringent crystal plate 114-2. In this case, different layers (e.g., the first birefringent crystal plate 114-1 and the second birefringent crystal plate 114-2) may be diced from one larger piece (e.g., of $YVO_4$). Accordingly, whereas the design shown in FIG. 1D achieves precise control over the thickness and angle of the components of the isolator core 110 by rotating two of three birefringent crystal plates 114, the design shown in FIG. 1E may ensure that the O-light and the E-light combine together to minimize PDL and/or insertion loss because the different layers have identical material tolerances. In this way, even if the layers in the isolator core 110 are not tuned perfectly, the O-light and the E-light will combine at the output from the isolator core 110 because the birefringent crystal plates 114-1, 114-2 layers have identical thicknesses and respective magnetic orientations (e.g., reversed or identical magnetic orientations) to cancel a material tolerance and an assembly tolerance with respect to one another.

In some implementations, as described above, the Faraday rotator 112 may be made from garnet. For example, the Faraday rotator 112 may be made from a rare-earth iron garnet (RIG) single crystal that generally needs a magnetic field to work as the Faraday rotator 112 or and/or a magnet-free garnet (referred to herein as a latching garnet). For example, when the Faraday rotator 112 is made from RIG single crystal and the RIG is exposed to an external magnetic field that is greater than a saturation field, a magnetic domain in a direction opposite to the external magnetic field is neutralized and a single magnetic domain is formed in the direction in which the direction of magnetization is aligned. In this way, because light passing through the RIG with a single magnetic domain is subject to Faraday rotation in one direction, the RIG single crystal can be used as the Faraday rotator 112. Alternatively, in cases where the Faraday rotator 112 is made from latching (or magnet-free) garnet, the Faraday rotator 112 may retain its single domain structure once magnetized in a strong external magnetic field even if the external magnetic field is later removed (although the single domain structure can be reversed by applying a strong external magnetic field). Accordingly, the latching garnet requires no external magnetic field when used as the Faraday rotator 112. In other words, the latching garnet functions as a Faraday rotator 112 without being exposed to an external magnetic field.

As indicated above, FIGS. 1A-1E are provided as one or more examples. Other examples may differ from what is described with regard to FIGS. 1A-1E.

Figure 2A:
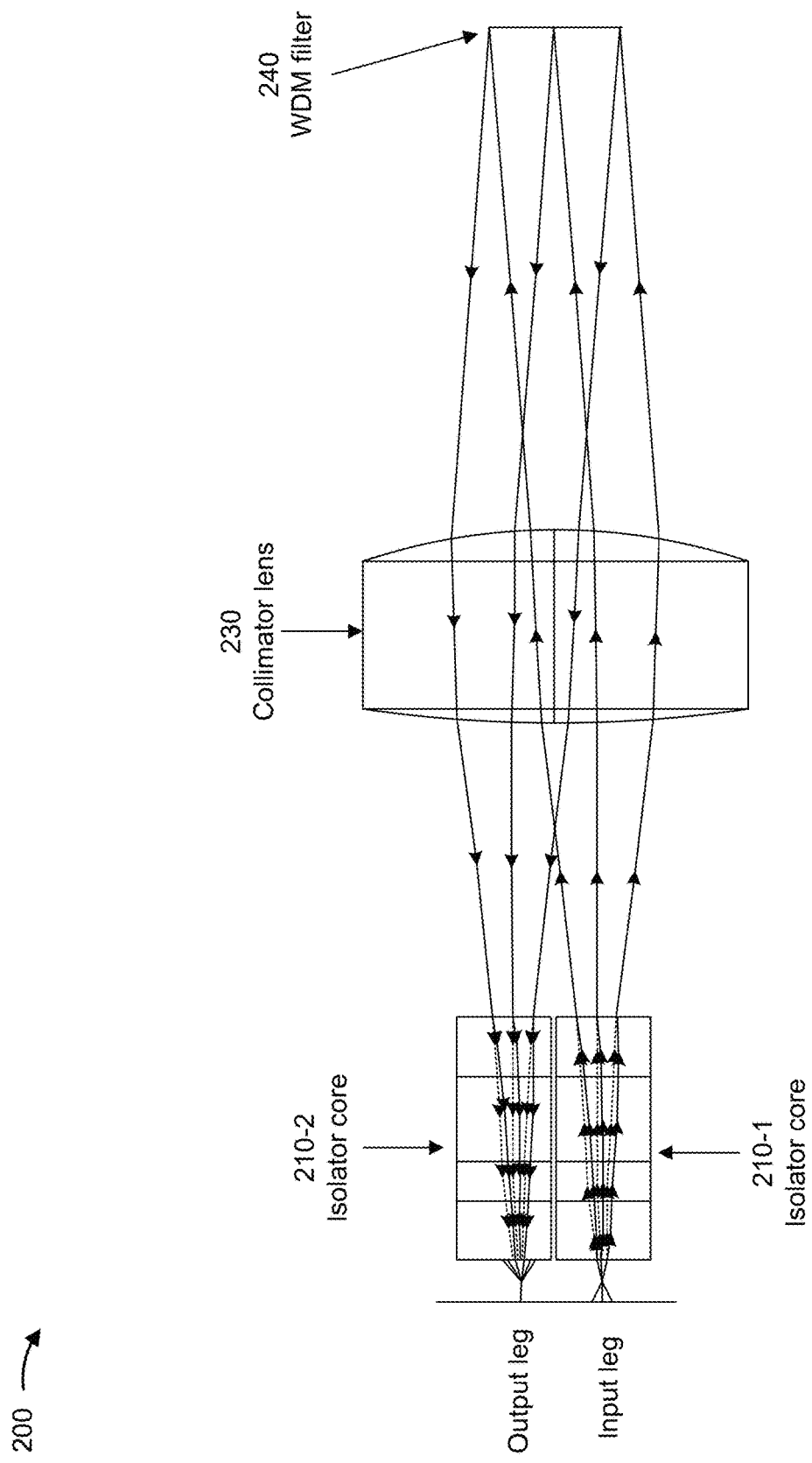
FIGS. 2A-2C illustrate one or more example implementations of a dual stage isolator including two isolator cores that are arranged in parallel.
Figure 2B:
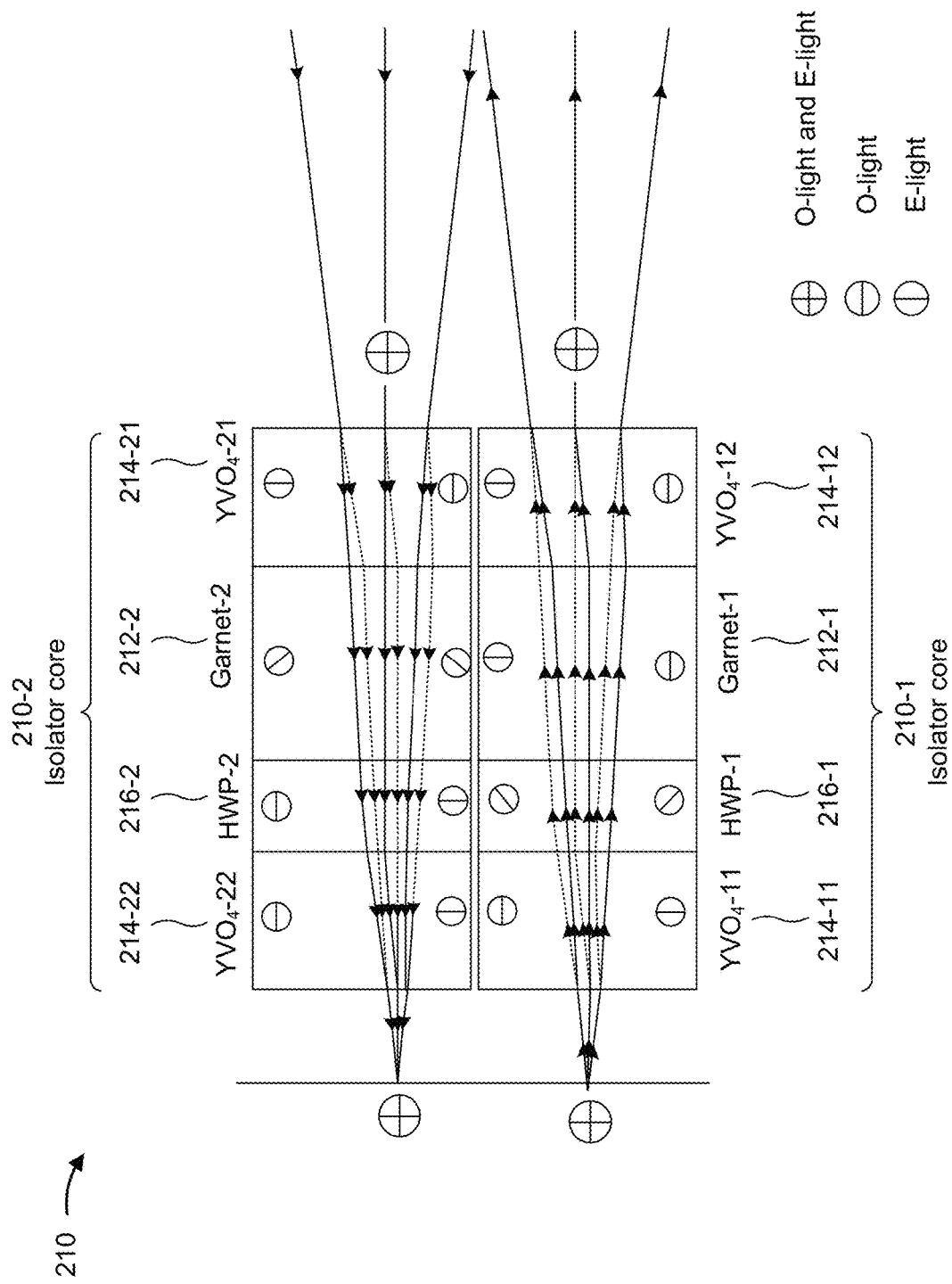
Figure 2C:
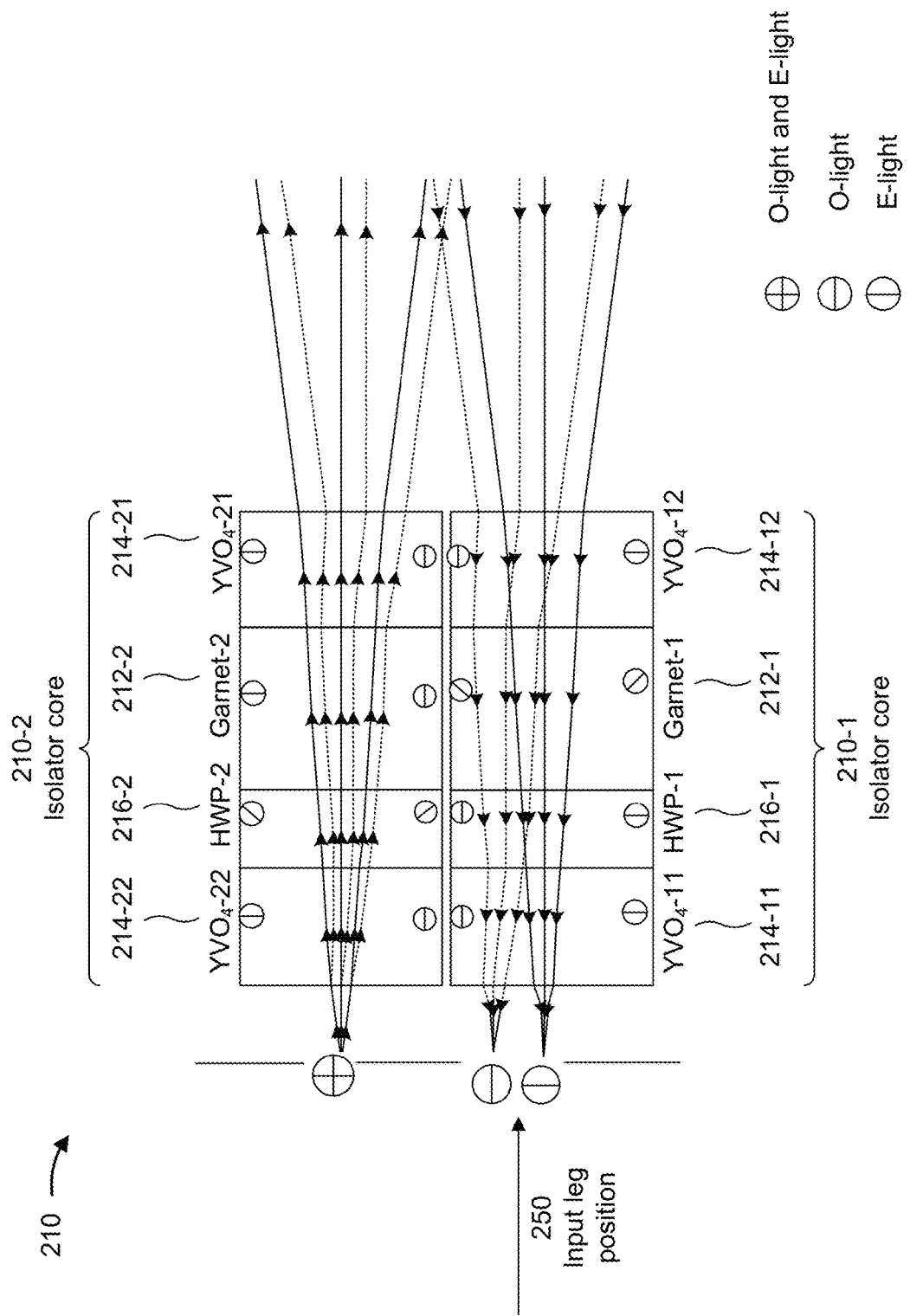

FIGS. 2A-2C illustrate one or more example implementations 200 of a dual stage isolator including two isolator cores that are arranged in parallel. For example, as shown in FIGS. 2A-2C, the dual stage isolator may include a first isolator core 210-1 and a second isolator core 210-2 arranged in parallel. For example, as shown in FIG. 2A, the first isolator core 210-1 may be provided in an input leg of an optical assembly and the second isolator core 210-2 may be provided in an output leg of the optical assembly. In this case, the dual stage isolator may be used with a collimator lens 230 and a WDM filter 240 in a standalone isolator application to only transmit light having a particular wavelength (e.g., 1550 nm), without integration with a pump.

As shown in FIG. 2B, the first isolator core 210-1 and the second isolator core 210-2, collectively referred to as dual stage isolator 210, includes a first set of layers and a second set of layers that are diced from the same pieces. For example, the first isolator core 210-1 includes a first HWP 216-1 and a first Faraday rotator 212-1 arranged between a first pair of birefringent crystal plates 214-11, 214-12, and the second isolator core 210-2 includes a second HWP 216-2 and a second Faraday rotator 212-2 arranged between a second pair of birefringent crystal plates 214-22, 214-21. In this case, the first isolator core 210-1 and the second isolator core 210-2 each have four crystal layers, the first isolator core 210-1 and the second isolator core 210-2 are both diced from one large piece, and the first isolator core 210-1 and the second isolator core 210-2 are arranged adjacent to one another with crystal layers in different orientations. For example, in some implementations, the first Faraday rotator 212-1 and the second Faraday rotator 212-2 may be oriented such that a magnetic domain direction of the first Faraday rotator 212-1 is reversed relative to the magnetic domain direction of the second Faraday rotator 212-2. Accordingly, because the various layers are diced from the same raw material, the dual stage isolator 210 may include two isolator cores 210-1, 210-2 in which the respective layers have certain properties (e.g., reversed orientations, identical thicknesses, identical angles, and/or the like) that cause the isolator cores 210-1, 210-2 to cancel material and/or assembly tolerances of each other. In this way, input light received at the input polarizer of the first isolator core 210-1 (e.g., birefringent plate 214-11) may be spatially separated into components (e.g., O-light and E-light) having orthogonal polarizations, and the components may recombine at the output polarizer of the first isolator core 210-1 (e.g., birefringent plate 214-12) even if the first set of layers is not perfectly tuned. In a similar respect, after the light that is laterally displaced by the first isolator core 210-1 passes through the collimator lens 230 and is reflected back towards the output leg by the WDM filter 240, the reflected light received at the input polarizer of the second isolator core 210-2 (e.g., birefringent plate 214-21) may be spatially separated into the orthogonal components, which again recombine at the output polarizer of the second isolator core 210-2 (e.g., birefringent plate 214-22) such that the second isolator core 210-2 laterally displaces the light received at the input polarizer. Furthermore, as shown in FIG. 2C, and by reference number 250, any backward travelling light that is reflected from the output leg to the input leg is separated into the components that have the orthogonal polarizations. In this way, the design of the dual stage isolator 210 causes the backward travelling light to be directed or otherwise steered away from a spot or position where the light is input through the input leg. In this way, the backward travelling light is not coupled into the input leg, which achieves high isolation between the input leg and the output leg.

As indicated above, FIGS. 2A-2C are provided as one or more examples. Other examples may differ from what is described with regard to FIGS. 2A-2C.

Figure 3A:
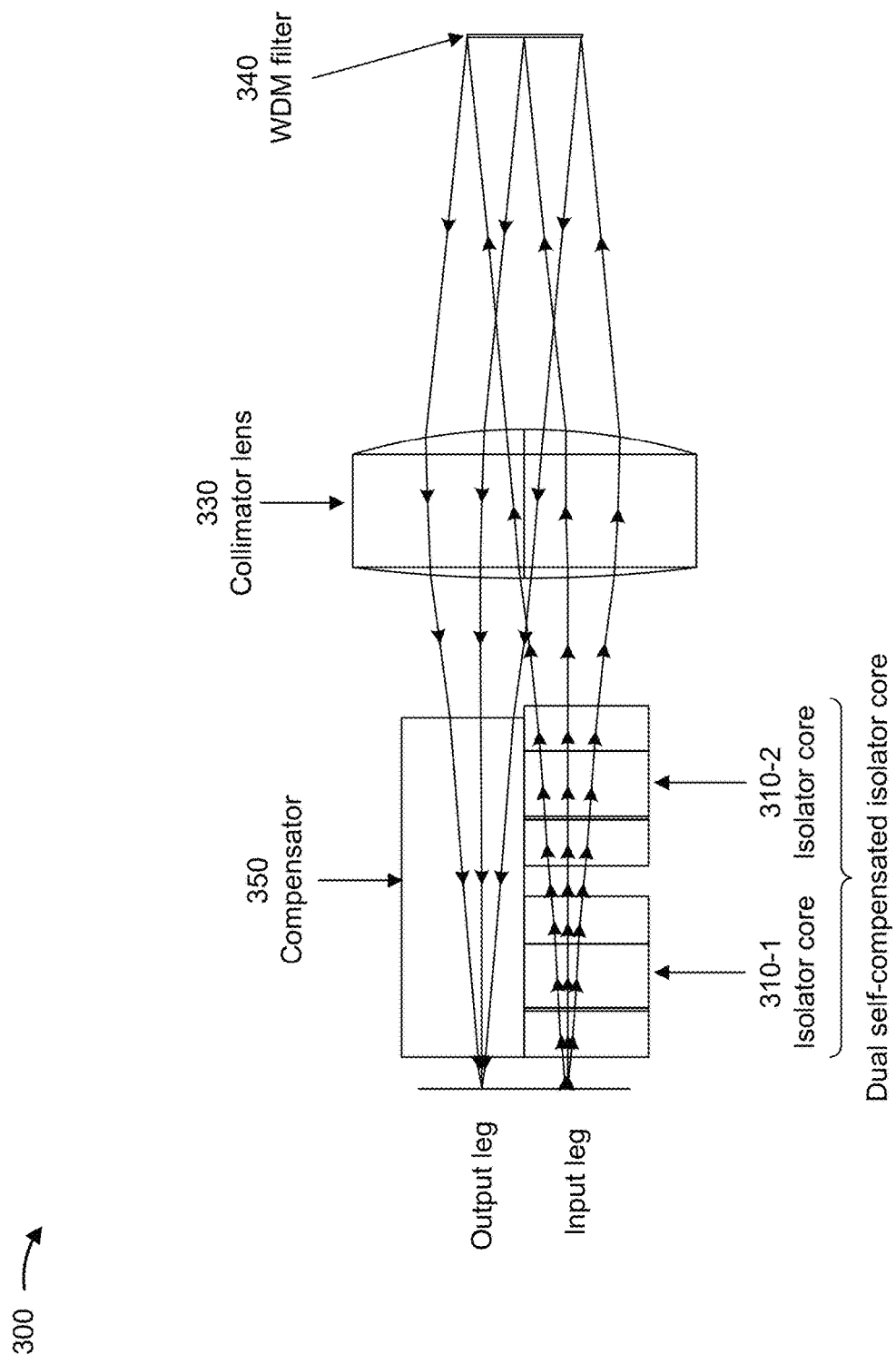
FIGS. 3A-3C illustrate one or more example implementations of a dual stage isolator including two isolator cores that are arranged in series.
Figure 3B:
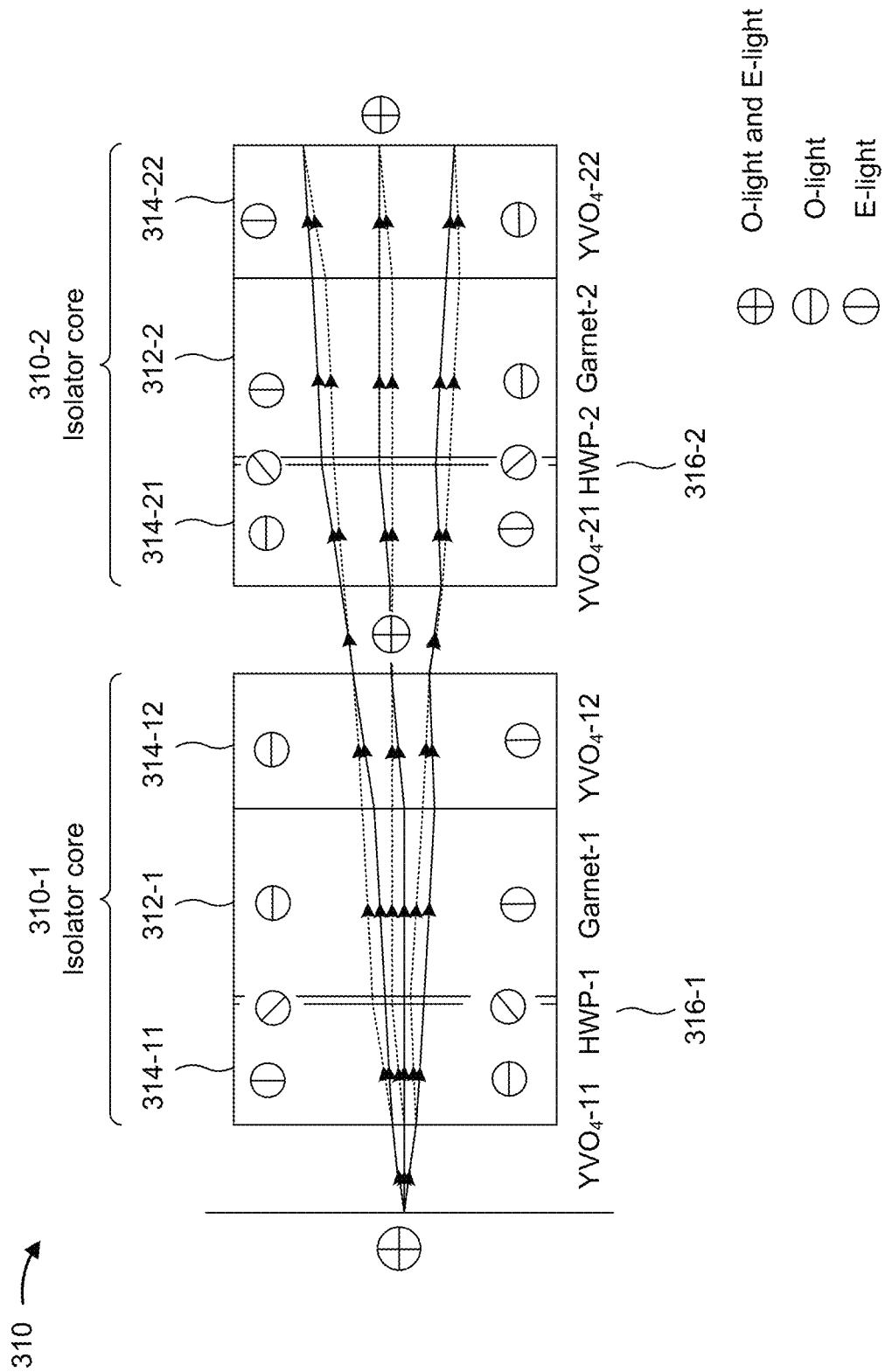
Figure 3C:
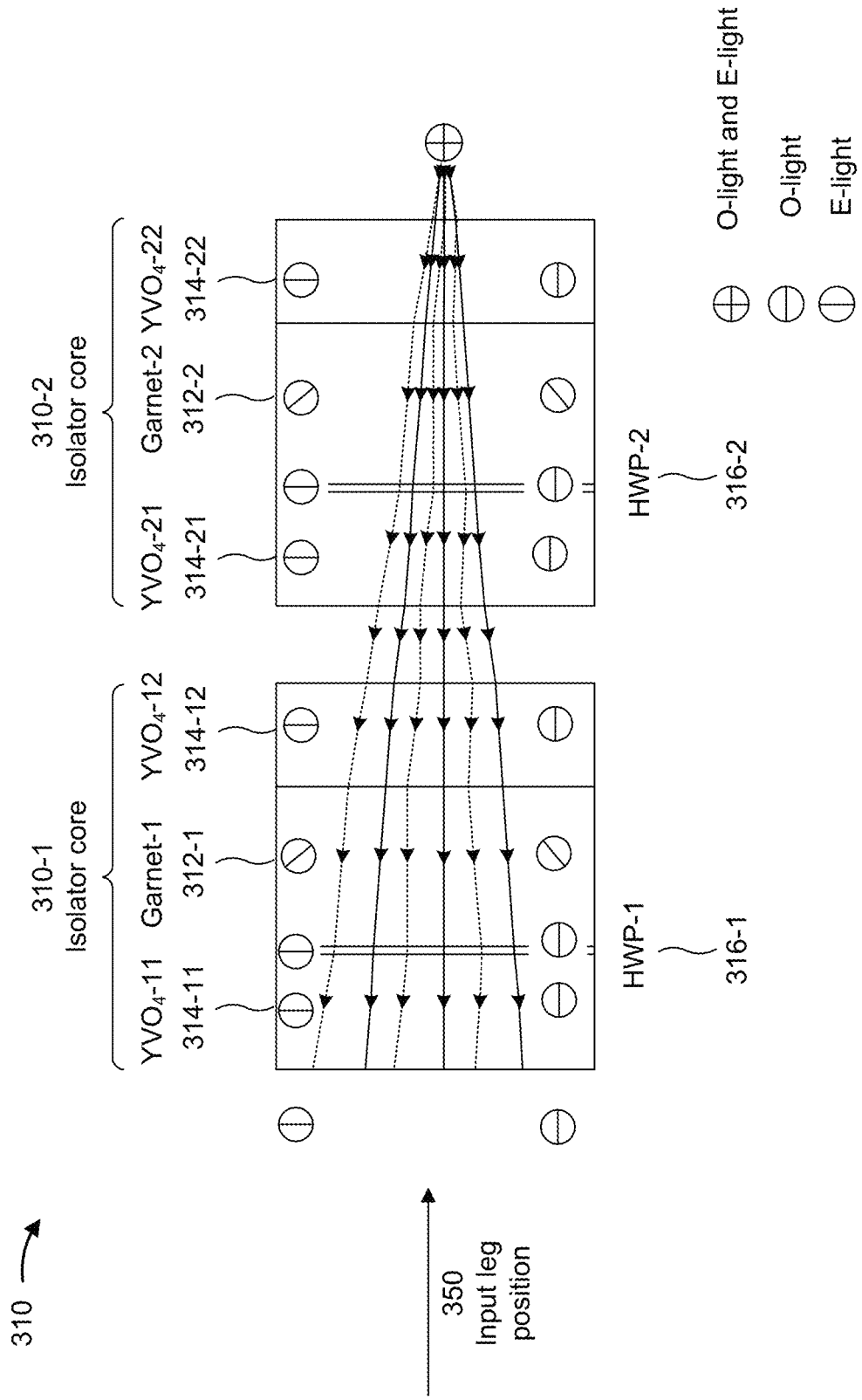

FIGS. 3A-3C illustrate one or more example implementations 300 of a dual stage isolator including two isolator cores that are arranged in series. For example, as shown in FIGS. 3A-3C, the dual stage isolator may include a first isolator core 310-1 and a second isolator core 310-2 arranged in series. For example, as shown in FIG. 3A, the first isolator core 310-1 and the second isolator core 310-2 may both be provided in an input leg of an optical assembly with a compensator 350 provided in the output leg. Alternatively, in some implementations, the first isolator core 310-1 and the second isolator core 310-2 (collectively dual self-compensated isolator core 310) may both be provided in the output leg of an optical assembly with the compensator 350 provided in the input leg. In such cases, the dual stage isolator may be used with a collimator lens 330 and a WDM filter 340 in a standalone isolator application to only transmit light having a particular wavelength (e.g., 1550 nm), without integration with a pump, or the dual stage isolator may be used in a pump combiner or another suitable device or application to achieve a higher isolation relative to the single stage design(s) described above.

As shown in FIG. 3B, the first isolator core 310-1 and the second isolator core 310-2 respectively include a first set of layers and a second set of layers that are diced from the same pieces. For example, the first isolator core 310-1 includes a first HWP 316-1 and a first Faraday rotator 312-1 arranged between a first pair of birefringent crystal plates 314-11, 314-12, and the second isolator core 310-2 includes a second HWP 316-2 and a second Faraday rotator 312-2 arranged between a second pair of birefringent crystal plates 314-22, 314-21. In this case, where the first isolator core 310-1 and the second isolator core 310-2 are arranged in series, the first Faraday rotator 312-1 and the second Faraday rotator 312-2 may be oriented such that a magnetic domain direction of the first Faraday rotator 312-1 is the same as the magnetic domain direction of the second Faraday rotator 312-2. Accordingly, because the various layers are diced from the same raw material (e.g., the same garnet and/or $YVO_4$ pieces), the dual stage isolator 310 may include two isolator cores 310-1, 310-2 that have certain properties (e.g., identical magnetic orientations, thicknesses, angles, and/or the like). In this way, input light received at the input polarizer of the first isolator core 310-1 (e.g., birefringent plate 314-11) may be spatially separated into components (e.g., O-light and E-light) having orthogonal polarizations, and the components may recombine at the output polarizer of the first isolator core 310-1 (e.g., birefringent plate 314-12) even if the first set of layers is not perfectly tuned. In a similar respect, the light that is laterally displaced by the first isolator core 310-1 is received at the input polarizer of the second isolator core 310-2 (e.g., birefringent plate 314-21), where the light is again spatially separated into orthogonal components that recombine at the output polarizer of the second isolator core 310-2 (e.g., birefringent plate 314-22). Accordingly, after the light laterally displaced by the second isolator core 310-2 passes through the collimator lens 330, the light that includes the components with orthogonal polarizations is reflected back towards the output leg by the WDM filter 340. Furthermore, as shown in FIG. 3C, and by reference number 350, any backward travelling light that is reflected from the output leg to the input leg is separated into the components that have the orthogonal polarizations. In this way, the design of the dual stage isolator 310 causes the backward travelling light to be directed or otherwise steered away from a spot or position where the light is input through the input leg, whereby the backward travelling light is not coupled into the input leg and high isolation is achieved between the input leg and the output leg.

As indicated above, FIGS. 3A-3C are provided as one or more examples. Other examples may differ from what is described with regard to FIGS. 3A-3C.

The foregoing disclosure provides illustration and description, but is not intended to be exhaustive or to limit the implementations to the precise form disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

As used herein, the terms circuit, integrated circuit, chip, chipset, die, semiconductor device, electronic device, and/or the like are intended to be broadly construed as applicable to the various implementations described herein, as these terms can be used interchangeably in the field of electronics. With respect to a circuit, an integrated circuit, and/or the like, power, ground, and various signals may be coupled between and among circuit elements (e.g., resistors, inductors, capacitors, transistors, and/or the like) via physical, electrically conductive connections. Such a point of connection may be referred to as an input, output, input/output (I/O), terminal, line, pin, pad, port, interface, or similar variants and combinations. Although connections between and among circuits can be made by way of electrical conductors, circuits and other circuit elements may additionally, or alternatively, be coupled by way of optical, mechanical, magnetic, electrostatic, electromagnetic, and/or other suitable interfaces.

It will be apparent that systems and/or methods described herein may be implemented in different forms of hardware, software, circuitry, or a combination thereof. The actual specialized control hardware, software code, or circuitry used to implement these systems and/or methods is not limiting of the implementations. Thus, the operation and behavior of the systems and/or methods are described herein without reference to specific software code—it being understood that software and hardware (e.g., integrated circuits) can be designed to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:
1. An optical assembly, comprising:
a first optical fiber and a second optical fiber;
a pump laser to provide pump light having a first wavelength, the pump light coupling into the first optical fiber through a first collimator lens, a wavelength-division multiplexing filter, a second collimator lens, and a compensator arranged between the first optical fiber and the second collimator lens; and
an isolator arranged between the second optical fiber and the second collimator lens to transmit signal light having a second wavelength, wherein the isolator includes a Faraday rotator and a plurality of birefringent crystal plates to laterally displace the signal light, wherein signal light received at the isolator includes light having a first polarization and light having a second polarization, and
wherein the isolator includes:
a Faraday rotator,
a first birefringent crystal plate having a first orientation with respect to the Faraday rotator, and
two birefringent crystal plates that are rotatable to angles to cause the light having the first polarization and the light having the second polarization to be combined into a laterally offset signal light.

2. The optical assembly of claim 1, wherein the first optical fiber is coupled to an output leg of the optical assembly and the second optical fiber is coupled to an input leg of the optical assembly.

3. The optical assembly of claim 1, wherein the first optical fiber is coupled to an input leg of the optical assembly and the second optical fiber is coupled to an output leg of the optical assembly.

4. The optical assembly of claim 1, wherein the Faraday rotator, of the first birefringent crystal plate, and the two birefringent crystal plates are bonded together by an adhesive material.

5. A single stage optical isolator, comprising:
a Faraday rotator; and
a plurality of birefringent crystal plates, wherein the plurality of birefringent crystal plates include:
   a first birefringent crystal plate to separate input light into light having a first polarization and light having a second polarization,
      wherein the first birefringent crystal plate has a fixed orientation with respect to the Faraday rotator,
   a second birefringent crystal plate to combine the light having the first polarization and the light having the second polarization into output light that is laterally displaced by the single stage optical isolator,
      wherein the Faraday rotator is provided between the first birefringent crystal plate and the second birefringent crystal plate, and
   a third birefringent crystal plate provided between the Faraday rotator and the second birefringent crystal plate,
      wherein the second birefringent crystal plate and the third birefringent crystal plate are rotatable to respective angles that cause the light having the first polarization and the light having the second polarization to be combined in the output light.

6. The single stage optical isolator of claim 5, wherein the Faraday rotator comprises a garnet material and the plurality of birefringent crystal plates comprise an Yttrium orthovanadate material.

7. The single stage optical isolator of claim 5, wherein the single stage optical isolator is coupled in an optical assembly between a collimator lens and an input leg of the optical assembly.

8. The single stage optical isolator of claim 5, wherein the Faraday rotator and the plurality of birefringent crystal plates are bonded together by an adhesive material.

9. The optical assembly of claim 1, wherein the Faraday rotator comprises a garnet material.

10. The optical assembly of claim 1, wherein the first birefringent crystal plate and the two birefringent crystal plates comprise an Yttrium orthovanadate material.

11. The optical assembly of claim 1, wherein the first collimator lens and the second collimator lens are aspheric lenses.

12. The optical assembly of claim 1, wherein the first wavelength is 980 nanometers, and the second wavelength is 1550 nanometers.

13. The optical assembly of claim 1, wherein the isolator has a diameter less than or equal to 3 millimeters.

14. The single stage optical isolator of claim 5, wherein the single stage optical isolator is coupled in an optical assembly between a collimator lens and an output leg of the optical assembly.

15. A single stage optical isolator, comprising:
a Faraday rotator; and
a plurality of birefringent crystal plates, wherein the plurality of birefringent crystal plates include:
   a first birefringent crystal plate to separate input light into light having a first polarization and light having a second polarization,
   a second birefringent crystal plate to combine the light having the first polarization and the light having the second polarization into output light that is laterally displaced by the single stage optical isolator,
      wherein the Faraday rotator is provided between the first birefringent crystal plate and the second birefringent crystal plate, and
      wherein the first birefringent crystal plate and the second birefringent crystal plate are rotatable to respective angles that cause the light having the first polarization and the light having the second polarization to be combined in the output light, and
   a third birefringent crystal plate provided between the Faraday rotator and the second birefringent crystal plate,
      wherein the third birefringent crystal plate has a fixed orientation with respect to the Faraday rotator.

16. The single stage optical isolator of claim 15, wherein the Faraday rotator comprises a garnet material.

17. The single stage optical isolator of claim 15, wherein the plurality of birefringent crystal plates comprise an Yttrium orthovanadate material.

18. The single stage optical isolator of claim 15, wherein the single stage optical isolator is coupled in an optical assembly between a collimator lens and an input leg of the optical assembly.

19. The single stage optical isolator of claim 15, wherein the single stage optical isolator is coupled in an optical assembly between a collimator lens and an output leg of the optical assembly.

20. The single stage optical isolator of claim 15, wherein the Faraday rotator and the plurality of birefringent crystal plates are bonded together by an adhesive material.

* * * * *